United States Patent
Juffa et al.

(10) Patent No.: US 6,408,379 B1
(45) Date of Patent: *Jun. 18, 2002

(54) APPARATUS AND METHOD FOR EXECUTING FLOATING-POINT STORE INSTRUCTIONS IN A MICROPROCESSOR

(75) Inventors: Norbert Juffa, San Jose; Stephan Meier; Stuart Oberman, both of Sunnyvale, all of CA (US); Scott White, Austin, TX (US)

(73) Assignee: Advanced Micro Devices, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/329,718

(22) Filed: Jun. 10, 1999

(51) Int. Cl.$^7$ ................................. G06F 7/38
(52) U.S. Cl. ................ 712/222; 712/217; 712/218; 708/498
(58) Field of Search .................... 712/222, 216–218; 708/498, 495

(56) References Cited

U.S. PATENT DOCUMENTS

| | | | |
|---|---|---|---|
| 4,961,161 A | * 10/1990 | Kojima | 708/525 |
| 5,058,048 A | 10/1991 | Gupta et al. | |
| 5,646,875 A | * 7/1997 | Taborn et al. | 708/508 |
| 5,678,016 A | * 10/1997 | Eisen et al. | 712/216 |
| 5,903,479 A | 5/1999 | Schwarz et al. | |
| 5,940,311 A | 8/1999 | Dao et al. | |
| 6,009,511 A | * 12/1999 | Lynch et al. | 712/222 |
| 6,044,454 A | * 3/2000 | Schwarz et al. | 712/201 |
| 6,049,860 A | * 4/2000 | Krygowski et al. | 712/25 |
| 6,219,684 B1 | * 4/2001 | Saxena et al. | 708/496 |
| 6,219,685 B1 | * 4/2001 | Story | 708/498 |
| 6,275,838 B1 | 8/2001 | Blomgren et al. | |

* cited by examiner

Primary Examiner—Richard L. Ellis
Assistant Examiner—Gautam R. Patel
(74) Attorney, Agent, or Firm—Conley, Rose & Tayon, PC; Rory D. Rankin

(57) ABSTRACT

An apparatus and method for executing floating-point store instructions in a microprocessor is provided. If store data of a floating-point store instruction corresponds to a tiny number and an underflow exception is masked, then a trap routine can be executed to generate corrected store data and complete the store operation. In response to detecting that store data corresponds to a tiny number and the underflow exception is masked, the store data, store address information, and opcode information can be stored prior to initiating the trap routine. The trap routine can be configured to access the store data, store address information, and opcode information. The trap routine can be configured to generate corrected store data and complete the store operation using the store data, store address information, and opcode information.

22 Claims, 12 Drawing Sheets

| Value | Sign | Exponent | Significand |
|---|---|---|---|
| Zero | x | $00\ldots00_2$ | $0.00\ldots00_2$ |
| Infinity | x | $11\ldots11_2$ | $1.00\ldots00_2$ |
| QNaN | x | $11\ldots11_2$ | $1.1xx\ldots xx_2$ |
| SNaN | x | $11\ldots11_2$ | $1.0xx\ldots xx_2$ |
| Denormal | x | $00\ldots00_2$ | $0.xx\ldots xx_2$ |

*FIG. 2*

APPARATUS AND METHOD FOR EXECUTING FLOATING-POINT STORE INSTRUCTIONS IN A MICROPROCESSOR

BACKGROUND OF THE INVENTION

1. Field of the Invention

This invention relates generally to the field of microprocessors and, more particularly, to executing floating-point store instructions in a microprocessor.

2. Description of the Related Art

Microprocessors are typically designed with a number of "execution units" that are each optimized to perform a particular set of functions or instructions. For example, one or more execution units within a microprocessor may be optimized to perform memory accesses, i.e., load and store operations. Other execution units may be optimized to perform general arithmetic and logic functions, e.g., shifts and compares. Many microprocessors also have specialized execution units configured to perform more complex floating-point arithmetic operations including multiplication and reciprocal operations. These specialized execution units typically comprise hardware that is optimized to perform one or more floating-point arithmetic functions.

Most microprocessors must support multiple data types. For example, x86 compatible microprocessors must execute instructions that are defined to operate upon an integer data type and instructions that are defined to operate upon floating-point data types. Floating-point data can represent numbers within a much larger range than integer data. For example, a 32-bit signed integer can represent the integers between $-2^{31}$ and $2^{31}-1$ (using two's complement format). In contrast, a 32-bit ("single precision") floating-point number as defined by the Institute of Electrical and Electronic Engineers (IEEE) Standard 754 has a range (in normalized format) from $2^{-126}$ to $2^{127} \times (2-2^{-23})$ in both positive and negative numbers.

Turning now to FIG. 1A, an exemplary format for an 8-bit integer 100 is shown. As illustrated in the figure, negative integers are represented using the two's complement format 104. To negate an integer, all bits are inverted to obtain the one's complement format 102. A constant of one is then added to the least significant bit (LSB).

Turning now to FIG. 1B, an exemplary format for a 32-bit (single precision) floating-point number is shown. A floating-point number is represented by a significand, an exponent and a sign bit. The base for the floating-point number is raised to the power of the exponent and multiplied by the significand to arrive at the number represented. In microprocessors, base 2 is typically used. The significand comprises a number of bits used to represent the most significant digits of the number. Typically, the significand comprises one bit to the left of the radix point and the remaining bits to the right of the radix point. In order to save space, the bit to the left of the radix point, known as the integer bit, is not explicitly stored. Instead, it is implied in the format of the number. Additional information regarding floating-point numbers and operations performed thereon may be obtained in IEEE Standard 754 (IEEE-754). Unlike the integer representation, two's complement format is not typically used in the floating-point representation. Instead, sign and magnitude form are used. Thus, only the sign bit is changed when converting from a positive value 106 to a negative value 108.

Numerical data formats, such as the IEEE-754, often include a number of special and exceptional cases. These special and exceptional cases may appear in one or more operands or one or more results for a particular instruction. FIG. 2 illustrates the sign, exponent, and significand formats of special and exceptional cases that are included in the IEEE-754 floating-point standard. The special and exceptional cases shown in FIG. 2 include a zero value, an infinity value, NaN (not-a-number) values, and a denormal value. An 'x' in FIG. 2 represents a value that can be either one or zero. NaN values may include a QNaN (quiet not-a-number) value and a SNaN (signaling not-a-number) value as defined by a particular architecture. The numbers depicted in FIG. 2 are shown in base 2 format as indicated by the subscript 2 following each number. As shown, a number with all zeros in its exponent and significand represents a zero value in the IEEE-754 floating-point standard. A number with all ones in its exponent, a one in the most significant bit of its significand, and zeros in the remaining bits of its significant represents an infinity value. The remaining special and exceptional cases are depicted similarly.

Floating-point execution units are generally configured to execute floating-point store instructions. Typically, floating-point store instructions are designed to store a floating-point value, i.e. store data, to a memory location. Prior to storing a store data, however, a floating-point execution unit must examine it to ensure that it does not correspond to a value that is smaller than the minimum number that can be represented in the floating-point precision of the store data. A value that is smaller than the minimum number that can be represented in a given floating-point precision can be referred to as a tiny number.

Floating-point execution units often include an underflow mask to allow a programmer to disable an underflow exception if a tiny number is detected. If the underflow exception is masked and store data corresponds to a tiny number, a floating-point execution unit needs to ensure that the correct value is stored for a floating-point store instruction. Generating a correct value for store data that corresponds to a tiny number when the underflow exception is masked can require additional processing of the store data. The additional processing can result in an undesirable instruction latency for a floating-point store instruction. It would be desirable to reduce the instruction latencies associated with executing floating-point store instructions.

SUMMARY

The problems outlined above are in large part solved by the use the apparatus and method described herein. Generally speaking, an apparatus and method for executing floating-point store instructions in a microprocessor is provided. If store data of a floating-point store instruction corresponds to a tiny number and an underflow exception is masked, then a trap routine can be executed to generate corrected store data and complete the store operation. In response to detecting that store data corresponds to a tiny number and the underflow exception is masked, the store data, store address information, and opcode information can be stored prior to initiating the trap routine. The trap routine can be configured to access the store data, store address information, and opcode information. The trap routine can be configured to generate corrected store data and complete the store operation using the store data, store address information, and opcode information.

The use of the apparatus and method for executing floating-point store instructions may provide performance advantages over other systems. Generally speaking, store data corresponds to a tiny number only in rare instances. By executing a trap routine to handle store data that corresponds to a tiny number, the apparatus and method may allow floating-point store instructions to execute in a more efficient manner by generating corrected store data with the trap routine. As a result, the apparatus and method may allow floating-point store instructions whose store data does not correspond to a tiny number to complete in fewer clock cycles.

Broadly speaking, a microprocessor including a floating-point execution unit, a reorder buffer, and a load/store unit is contemplated. The floating-point execution unit is configured to execute a floating-point store instruction. The floating-point store instruction specifies store data and a store address. The reorder buffer is coupled to said floating-point execution unit and includes a reorder buffer tag that corresponds to the floating-point store instruction. The load/store unit is coupled to the floating-point execution unit. The floating-point execution unit is configured to write the store data to a register in the floating-point execution unit, to determine whether the store data corresponds to a denormal value, and to convey a cancel signal to the load/store unit in response to the store data corresponding to the denormal value. The load/store unit is configured to cancel a store operation corresponding to the floating-point store instruction in response to receiving the cancel signal.

A method executing a floating-point store instruction is also contemplated. The method includes receiving the floating-point store instruction, wherein the floating-point store instruction specifies store data. The method also includes assigning a register to the floating-point store instruction, writing the store data to the register, conveying a store tag corresponding to the floating-point store instruction to a load/store unit, determining whether the store data corresponds to a denormal value, and conveying a cancel signal to the load/store unit if the store data corresponds to said denormal value.

In addition, a floating-point execution unit is contemplated. The floating-point execution unit includes a register rename unit configured to receive a floating-point store instruction, wherein said floating-point store instruction specifies store data. The floating-point execution unit also includes a scheduler coupled to the register rename unit and configured to schedule the floating-point store instruction for execution, a floating-point execution pipeline coupled to the scheduler and configured to execute the floating-point store instruction, and a control unit coupled to the scheduler and the floating-point execution pipeline. The register rename unit is configured to assign a destination register tag to the floating-point store instruction. The scheduler is configured to write the store data to a register corresponding to the destination register tag. The floating-point execution pipeline is configured to determine whether the store data corresponds to a denormal value, and the control unit is configured assert a store cancel signal in response to the store data corresponding to the denormal value.

Furthermore, a computer system comprising a microprocessor and an input/output device is contemplated. The microprocessor includes a floating-point execution unit, a reorder buffer, and a load/store unit. The floating-point execution unit is configured to execute a floating-point store instruction. The floating-point store instruction specifies store data and a store address. The reorder buffer is coupled to said floating-point execution unit and includes a reorder buffer tag that corresponds to the floating-point store instruction. The load/store unit is coupled to the floating-point execution unit. The floating-point execution unit is configured to write the store data to a register in the floating-point execution unit, to determine whether the store data corresponds to a denormal value, and to convey a cancel signal to the load/store unit in response to the store data corresponding to the denormal value. The load/store unit is configured to cancel a store operation corresponding to the floating-point store instruction in response to receiving the cancel signal. The input/output device is configured to communicate between the microprocessor and another computer system.

BRIEF DESCRIPTION OF THE DRAWINGS

Other objects and advantages of the invention will become apparent upon reading the following detailed description and upon reference to the accompanying drawings in which:

FIG. 2 is a table listing special cases for a defined floating-point data format.

Figures 1A, 1B:
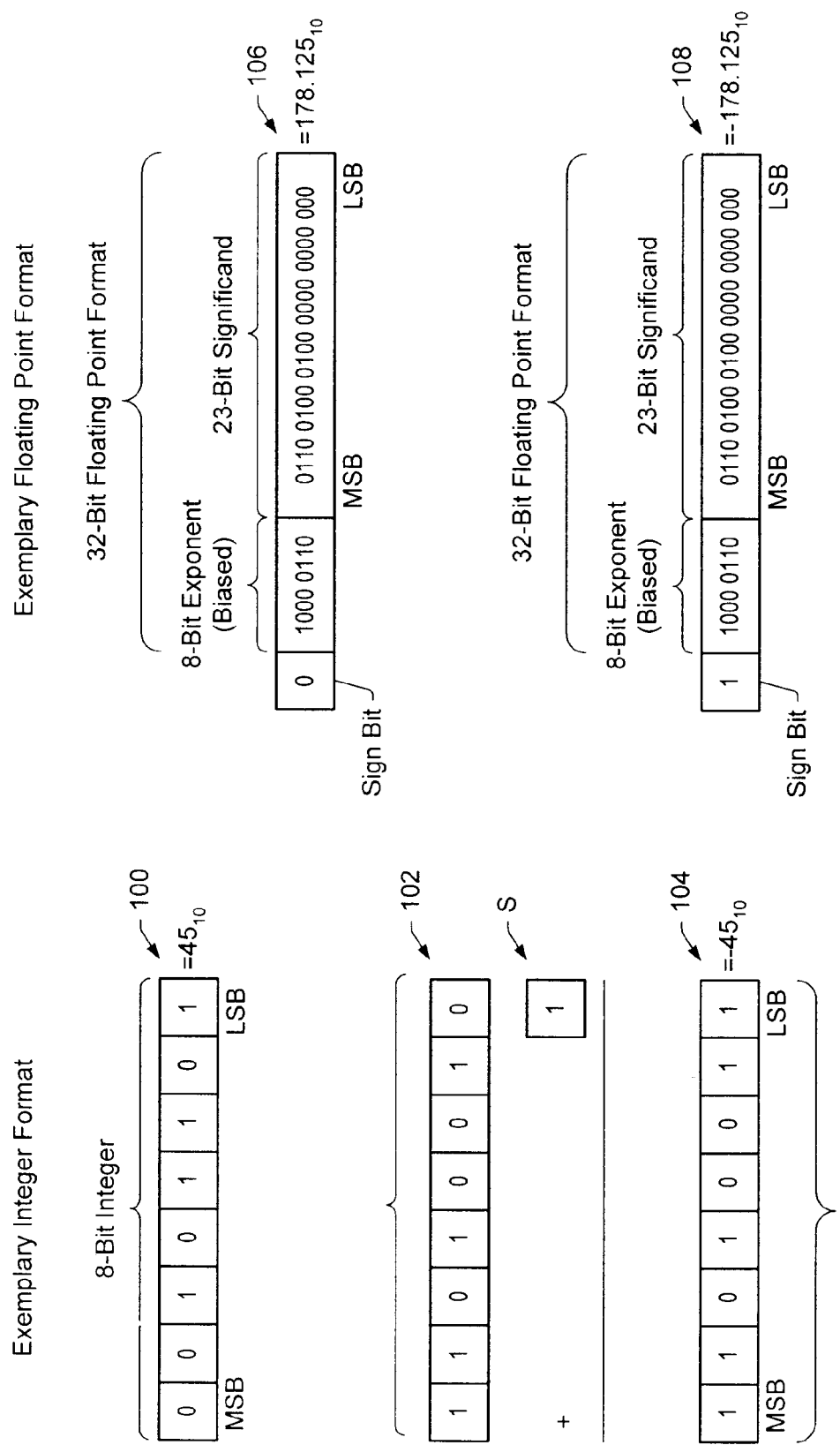
FIG. 1A is a diagram of an exemplary integer data format using two's complement representation.
FIG. 1B is a diagram of an exemplary floating-point data format.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF AN EMBODIMENT

Figure 3:
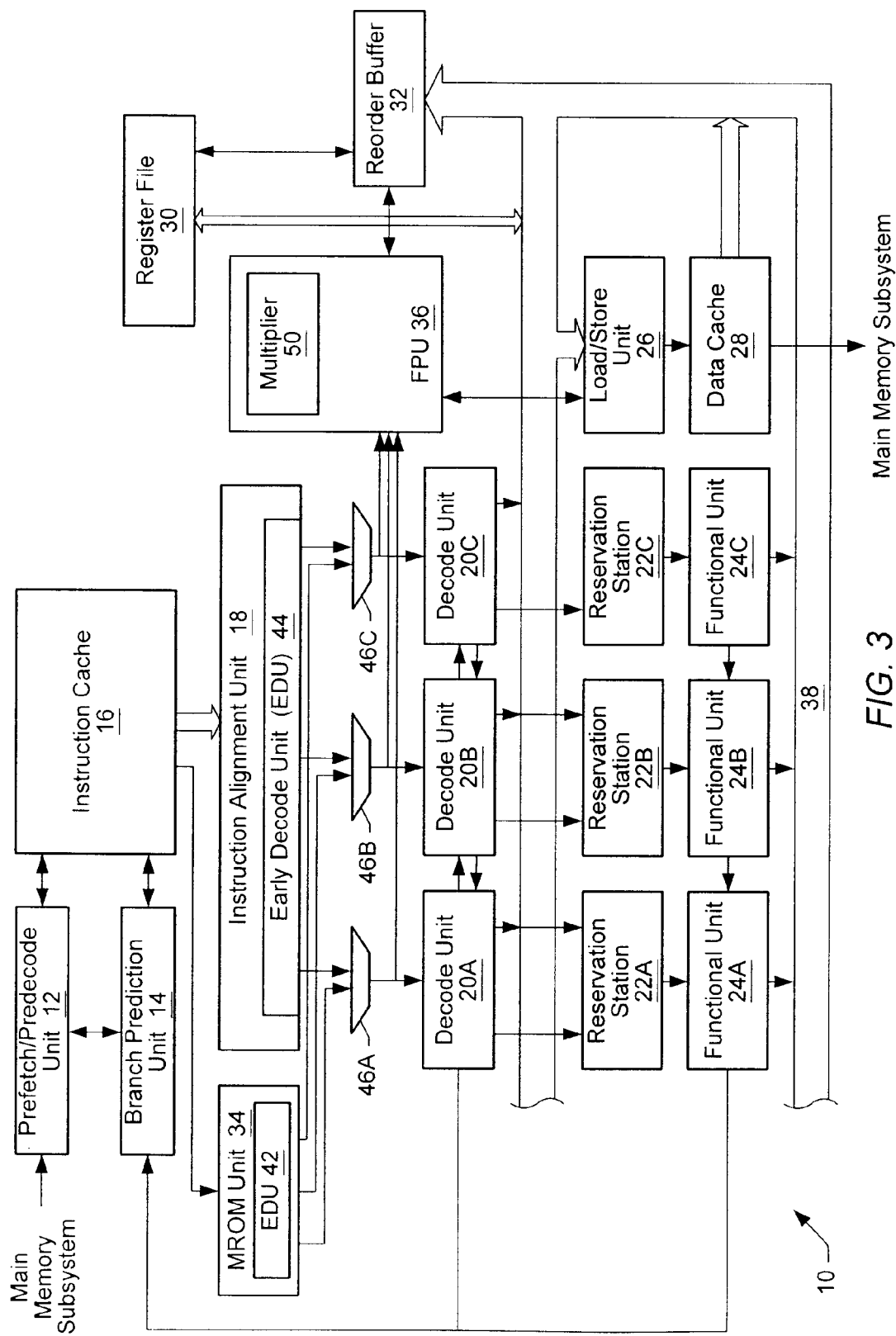
FIG. 3 is a block diagram of one embodiment of an exemplary microprocessor.

Turning now to FIG. 3, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a floating-point unit (FPU) 36, which in turn comprises multiplier 50. Note that elements referred to herein with a particular reference number followed by a letter may be collectively referred to by the reference number alone. For example, decode units 20A–20C may be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18, which comprises an early decode unit (EDU) 44, is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. MROM unit 34, which also comprises an early decode unit (EDU) 42 is coupled to decode units 20 and FPU 36. Finally, FPU 36 is coupled to load/store unit 26 and reorder buffer 32.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 2-way set associative structure having 64-byte lines (a byte comprises 8 binary bits). It is noted that instruction cache 16 may be implemented in a fully-associative, set-associative, or direct-mapped configuration.

Instructions are fetched from main memory and stored into instruction cache 16 by prefetch/predecode unit 12. Instructions may be prefetched prior to the request thereof in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction may be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| Start bits | 10000 |
| End bits | 00001 |
| Functional bits | 11000 |

According to one particular embodiment, early identifying that an instruction includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which case subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18l and MROM unit 34. As instructions are fetched from instruction cache 16, the corresponding predecode data is scanned to provide information to instruction alignment unit 18 and MROM unit 34 regarding the instructions being fetched. Instruction alignment unit 18 utilizes the scanning data to align an instruction to each of multiplexers 46A–C. In one embodiment, instruction alignment unit 18 aligns instructions from three sets of eight instruction bytes to decode units 20. Similarly, MROM unit 34 is configured to output up to three aligned instructions to multiplexers 46A–C. Note, both instruction alignment unit 18 and MROM unit 34 may each have an early decode unit (EDC) 42 and 44. These units may perform the first steps of the decoding process, e.g., identifying the operand specifiers for each instruction.

Each multiplexer 46A–C is configured to receive a partially decoded instruction (and corresponding decode and predecode information) from instruction alignment unit 18 and MROM unit 34. Each multiplexer 46A–C is configured to select up to one instruction from either instruction alignment unit 18 or MROM unit 34 during each clock cycle. The selected instructions are routed to decode units 20A–C (integer instructions), and FPU 36 (x86 floating-point, MMX, and 3DX instructions). In one embodiment of microprocessor 10, up to three floating-point instructions per clock cycle may be conveyed to floating-point unit 36. As note above, the instructions may come from MROM unit 34 (microcode instructions) or instruction alignment unit 18 (fast path instructions).

Decode units 20 are configured to complete decoding instructions received from multiplexers 46A–C. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to six pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if both: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. Additionally, functional units 24 may be configured to perform address generation for load and store memory operations performed by load/store unit 26. In one particular embodiment, each functional unit 24 may comprise an execution unit and an independent address generation unit. Such functional units may perform an address generation for conveyance to load/store unit 26 in parallel with the execution of an integer or branch operation.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a pre-cache load/store buffer having twelve storage locations for data and address information for pending loads or stores and a post-cache load/store buffer having 32 entries. Decode units 20 arbitrate for access to load/store unit 26 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

Data cache 28 is a high speed cache memory provided to temporarily store data being transferred between load/store unit 26 and the main memory subsystem. In one embodiment, data cache 28 has a capacity of storing up to sixty-four kilobytes of data in a two way set associative structure. It is understood that data cache 28 may be implemented in a variety of specific memory configurations, including a set associative configuration.

Figure 4:
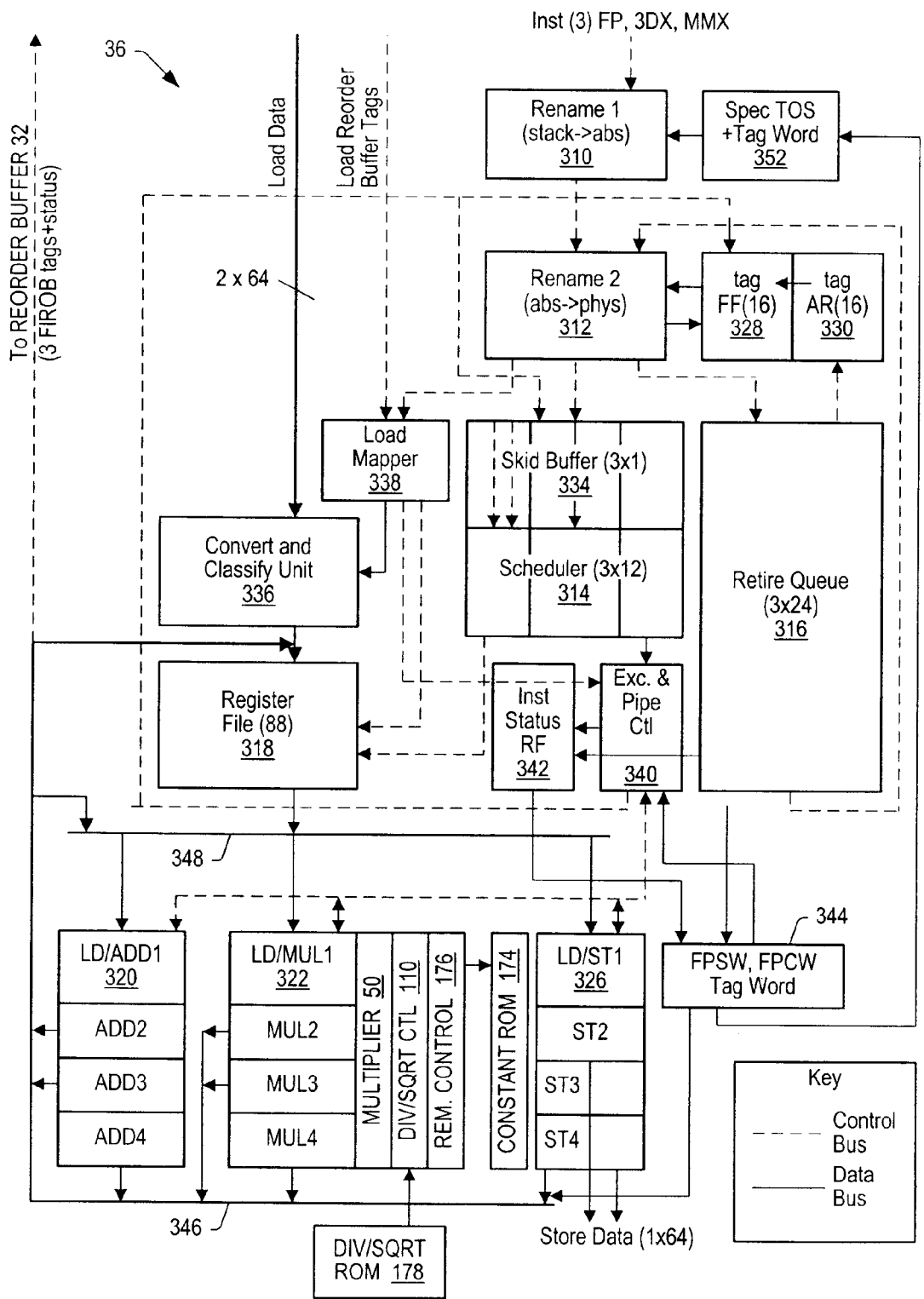
FIG. 4 is a block diagram of one embodiment of a floating-point unit from the exemplary microprocessor of FIG. 3.

Turning now to FIG. 4, details of one embodiment of FPU 36 are shown. Other embodiments are possible and contemplated. FPU 36 is a high performance out-of-order execution unit capable of accepting up to three new instructions per clock cycle. The three instructions may be any combination of x86 floating-point instructions, MMX instructions, or 3DX instructions. MMX and 3DX instructions are extensions to the standard x86 instruction set. One example of a 3DX instruction set extension is the 3DNow!™ extension from Advanced Micro Devices, Inc. MMX instructions are geared toward multimedia and two-dimensional graphic applications, while 3DX instructions are optimized for performing three-dimensional graphic manipulations such as rendering and texture mapping. Many 3DX instructions are vectored instructions that perform the same operation on a number of independent pairs of operands.

As the figure illustrates, this embodiment of FPU 36 comprises the following components: a rename-1 unit 310, a rename-2 unit 312, a scheduler 314, a retire queue 316, a register file 318, a load/add execution pipeline 320, a load/multiply execution pipeline 322, a load/store execution pipeline 326, a skid buffer 334, a convert and classify unit 336 and a load mapper 338. Rename-1 unit 310 is coupled to rename-2 unit 312 and is configured to receive a speculative top of stack (TOS) tag and tag word 352. Rename-2 unit 312 is coupled to future file tag array 328, architectural tag array 330, retire queue 316, skid buffer 334, scheduler 314, and load mapper 338. Convert and classify unit 336 is also coupled to load mapper 338, which in turn is coupled to execution and pipeline control unit 340 along with instruction status register file 342 and scheduler 314. Register file 318 receives inputs from convert and classify unit 336, load mapper 338 and scheduler 314, and outputs data to source operand bus 348. Source operand bus 348 is in turn coupled to execution pipelines 320, 322, and 326. Finally, execution pipelines 320, 322, and 326, and floating-point status/control/tag words 344 are all coupled to result bus 346. While floating-point status/control/tag words 344 and speculative top of stack and tag word 352 are shown separately in the figure for explanatory purposes, these tags may be stored together with future file tags 328 and architectural register tags 330 in a single storage location, e.g., within register file 318, execution and pipeline control unit 340, or retire queue 316.

Rename-1 unit 310 receives up to three instructions per clock cycle. As previously noted, these may be any combination of floating-point, MMX, or 3DX instructions. Rename-1 unit 310 converts stack-relative registers into absolute register numbers. For instructions with memory operands, e.g., FLD instructions (floating-point load), no conversion is necessary and the source operand can be identified as being from memory rather than a register. The x86 instruction set and architecture defines eight floating-point registers that are accessed in a stack-like manner (i.e., relative to a top-of-stack pointer). Rename-1 unit 310 also assigns each instruction to one of three execution pipelines, either load/store execution pipeline 326, load/add execution pipeline 320, or load/multiply execution pipeline 322 and, if necessary, converts each instruction to an internal format.

Rename-2 unit 312 performs true register renaming. Upon receiving the instructions from rename-1 unit 310, rename-2 unit 312 reads three register tags from a "free list" of the available registers stored within retire queue 316. Once the registers have been read, rename-2 unit 312 assigns one to the destination register of each instruction. To rename the source registers, rename-2 unit 312 indexes tag future file 328 using the absolute register number for each source register. Tag future file 328 stores tags that identify which registers store the current speculative future state of each of the sixteen architectural registers in FPU 36. Similarly, architectural register tag file 330 stores tags which identify which registers within register file 318 store the current architectural (non-speculative) state of FPU 36. Note, of the sixteen registers that define FPU 36's state (architectural or speculative), eight are architectural registers (i.e., floating-point stack or MMX registers) and eight are micro-architectural registers (i.e., registers that store internal state information that is not generally accessible to the programmmer). The old destination register tags are then read from the tag future file 328 and written to the tail of the free list. Finally, tag future file 328 is updated by storing tags for the new destination registers.

Memory operands may be handled by assigning them the same register tag as the destination register. This is because load data will be converted and directly written into the destination register when it is received from load/store unit 26. In the case of an FLD instruction, no further processing is required (except in certain exceptional cases), although the FLD instruction is still assigned to an execution pipeline for the purpose of handling exceptions and signaling completion to reorder buffer 32.

Once the three instructions have passed through rename-1 unit 310 and rename-2 unit 312, the instructions are represented in a three operand format (i.e., first source operand, second source operand, and destination operand). While the first source operand is always a register operand, a bit in the opcode may be used to indicate whether the second operand is a register operand or a memory operand.

From rename-2 unit 312 the instructions are passed to scheduler 314, where the three instructions are allocated a "line" of storage. If scheduler 314 is full, the instructions may be stored in skid buffer 334 until such time as there is room within scheduler 314. After receiving the three instructions, scheduler 314 snoops result bus 346 and source operand bus 348. Scheduler 314 may also snoop load data bus. Concurrently with allocating the line of storage and snooping, retire queue 316 allocates one entry for each instruction. The entries store the destination register tags, the absolute destination register number, and the old destination register tags. Additional information may also be included, e.g., information that may be needed to update the architectural state at retire time.

On the cycle following their entry into scheduler 314, the instructions are available for scheduling. Scheduler 314 examines all of the stored instructions and issues the oldest instructions which meet the following criteria: (1) the execution pipeline to which the instruction has been assigned is available, (2) the result bus for that execution pipeline will be available on the clock cycle in which the instruction will complete (this is dependent upon the latency of the particular instruction), and (3) the instruction's source registers and or memory operands are available. In this embodiment, scheduler 314 may schedule up to three instructions per clock cycle. Each of the three execution pipelines 320, 322, and 326 may accept a new instruction every clock cycle. Note other embodiments capable of scheduling four or more instructions are also possible and contemplated.

Once all three entries in a line are scheduled, that line is free to be compacted out of scheduler 314. When the instructions are conveyed from scheduler 314 to their respective instruction execution pipeline, their source operands are read. In some cases, the source data will come from a register, while in other cases the source data will come from a "bypass". A bypass refers to the practice of result forwarding or superforwarding. Result forwarding involves conveying the results from a recently executed instruction directly to other instructions that depend upon that result. Result forwarding allows the result to be used in subsequent instructions without having to wait for the result to be stored in a register and having to read the result from the register. Result superforwarding will be described in more detail below.

Each execution pipeline 320, 322, and 326 may be configured as a four-stage pipeline. In the first stage of each pipeline, the result buses are read and the input data is taken from either the source operand bus (if the data is within register file 318) or the result bus (if a bypass is being performed). Once the source data has been received, each execution pipeline may begin performing the appropriate computation.

In the embodiment shown in the figure, execution pipeline 320 is configured to perform load and addition operations, execution pipeline 322 is configured to perform load and multiplication operations, and execution pipeline 326 is configured to perform load and store operations. Both execution pipelines 320 and 322 may be configured to perform certain MMX instructions. Execution pipeline 322, which comprises multiplier 50, may also be configured to perform iterative calculations that involve multiplication, e.g., reciprocal operations, division operations, and square root operations, under the control of control unit 110, division/square root ROM 178, and, if a remainder is called for, remainder control unit 176. Constant ROM 174 is a read only memory configured to store a plurality of constants for load constant instructions such as FLDPI, for transcendental computation, for FPU 36 self-checking, and for certain special and exceptional results. Division/square root ROM 178 is a read only memory which stores constants used to determine initial values for division and square root computations and constants returned by certain 3DNow! instructions. Control unit 110 provides sequence information for division and square root functions. Note, in some embodiments control unit 110 may be part of execution and pipeline control unit 340.

In some cases, instruction operands or the results generated by executing an instruction may be too small to fit within the operand or result's standard data format. These numbers are referred to as "denormals". While normalized floating-point values have a non-zero exponent and a one in the most significant bit of the significand, i.e., the bit directly to the left of the binary radix point (e.g., 1.001010 . . . ), denormals are represented with a zero exponent and a zero in the most significant bit of the significand (e.g., 0.000101 . . . ). Denormal load data is detected and tagged by convert and classify unit 336. Denormal results generated by during execution within execution pipelines 320, 322, and 326 are tagged when they are generated. Execution and pipeline control unit 340 detects the presence of the denormal tags and calls an appropriate microcode routine from MROM 34 to handle the denormal data.

At the end of the final execution stage, the data is placed on result bus 346. This makes the result data available for an instruction entering the first stage of one of the instruction execution pipelines during the next clock cycle. Once the data is on the result bus, it may also be written into register file 318. Instead of being stored in register file 318, store data is sent to the load/store unit 26. The reorder buffer tag and any exception information is sent back to reorder buffer 32. At this point, the instructions are complete. However, they are still speculative. When the instructions reach the bottom of reorder buffer 32 (assuming there is no branch misprediction or exception abort), reorder buffer 32 notifies FPU 36 that the instructions should be retired. The speculative state of the floating-point unit 36 is committed to the architectural state when retire queue 316 updates the tags for the architectural register file 328, and the destination register tags in retire queue 316 are written to the architectural register file 318.

Convert and classify unit 336 receives all load data, classifies it by data type, and converts it to an internal format if necessary. In one embodiment, convert and classify unit 336 appends a three bit classification tag to each data item. The three bit tag classifies the accompanying data as one of the following eight potential data types: (1) zero, (2) infinity, (3) quiet NaN, (4) signaling NaN, (5) denormal, (6) MMX, (7) normal, or (8) unsupported. NaN is a standard abbreviation for "Not-a-Number". While representations may vary across different implementations, zero data types are typically represented with a zero exponent and a zero significand. Similarly, infinity data types are typically represented with an exponent comprising all asserted ones. A quiet NaN ("QNaN") is generated whenever a floating-point instruction causes an invalid operation, e.g., a square root operation on a negative number. A signaling NaN ("SNaN"), unlike a quiet NaN, generates an exception when used. Signaling NaNs are not generated by FPU 36 and are typically only used by programmers to signal particular error conditions. The table below illustrates the characteristics of each data type for x86 compatible floating-point units (wherein "x" represents either a one or a zero):

| Sign | Exponent | Significand | Value |
|------|----------|-------------|-------|
| x | $00...00_2$ | $0.00...00_2$ | Zero |
| x | $11...11_2$ | $1.00...00_2$ | Infinity |
| x | $11...11_2$ | $1.1xx...xx_2$ | QNaN |
| x | $11...11_2$ | $1.0xx...xx_2$ | SNaN |
| x | $00...00_2$ | $0.xx...xx_2$ | Denormal |

It is noted that these data types may conform to the IEEE-754 specification.

MMX data types are 64 bits wide and comprise either eight packed 8-bit bytes, four packed 16-bit words, or two packed 32-bit double-words. MMX data types may be detected by the MMX opcodes which precede them. Normal data types are standard floating-point values that are either single precision, double precision, or extended precision (before they are translated into an internal data format) and that do not have the characteristics of any of the previously described data types. Unsupported data types are extended precision bit patterns that do not fall into any of the previously described data types and that fall outside of the normal data type as defined by IEEE Standard 754. For example, an extended precision bit sequence having a 0 sign bit, a biased exponent of 11 . . . 11, and a significand in the format (f.ff . . . ff) of 0.11 . . . 11 is an unsupported value. Note, however, in other embodiments larger or smaller classification tags and additional or fewer data types may be implemented.

The data types and exemplary formats illustrated above describe the data as it is received and identified by convert and classify unit 336. Once convert and classify unit 336 classifies the data, the classification tag may be used to identify some or all of the data's properties. For example, if a value is classified as a zero, it may be identified solely by its classification tag instead of having to perform a wide comparison of each bit in the exponent and significand portions of the value. The classification tags may accompany the data throughout FPU 36 and may be stored in register file 18 along with the data.

As discussed above, when data from a load instruction is received by FPU 36, the data is routed to convert and classify unit 336. A corresponding reorder buffer tag accompanies the data and is routed to load mapper 338. As previously noted in the description of microprocessor 10, the reorder buffer tag identifies the sequence in which out of order instructions should be retired (i.e., committed to architectural state). For load instructions, the reorder buffer tag follows the data from load/store unit 26 to FPU 36. Load mapper 338 receives the reorder buffer tag and translates it into a physical register tag. The physical register tag indicates which data register within register file 318 the corresponding data is to be loaded into.

Execution and pipeline control unit 340 tracks the status of each stage in execution pipelines 320, 322, and 326. Execution and pipeline control unit 340 contains timing information enabling it to determine the future availability of each execution pipelines. For example, when an FMUL (floating-point multiply) instruction begins execution in multiplication execution pipeline 322, control unit 340 uses its stored timing information to notify scheduler 314 that the result will be available for output on result bus 346 four clock cycles later. This timing information allows scheduler 314 to efficiently schedule instruction for execution in execution pipelines 320, 322, and 326. Control unit 320 also tracks the status of each pipe stage, receiving and prioritizing exceptions from execution pipelines 320, 322, and 326.

FPU status word, control word, and tag word (collectively, words 344) are stored within retire queue 316 and indicate which of the status and control registers within register file 318 contain the FPU's current architectural state. For example, in one embodiment register file 318 may comprise 88 registers, i.e., 16 registers to store the current architectural state of FPU 36 (see below), and 72 speculative registers to store the speculative state of FPU 36. Of the 72 speculative registers, 16 of them store the "current" speculative state. Of each set of 16 registers that store a particular state of FPU 36 (whether the state is architectural or speculative), eight registers are FPU stack registers and eight registers are micro-architectural registers that store state information that is only accessible to microcode instructions within FPU 36, i.e., they are not accessible to the programmer and store only internal state information. In one embodiment, each register in register file 314 is 90 bits long, with 87 bits providing storage for internal format data (e.g., one sign bit, 18 exponent bits, and a 68-bit significand) and 3 class bits.

Instruction status register file 342 stores information for execution and pipeline control unit 340. As a result of instructions executing out of order in FPU 36, exceptions that occur within execution pipelines may need to be stored until the instructions generating them are the next to be retired. Retire queue 316 reads instruction status register file 342 when it retires instructions and updates the architectural floating-point status word (FPSW) and floating-point control word (FPCW) and tag word (collectively, 344) accordingly. This information is conveyed to rename-1 unit along with the current speculative top of stack 352 and on result bus 346.

Figure 5:
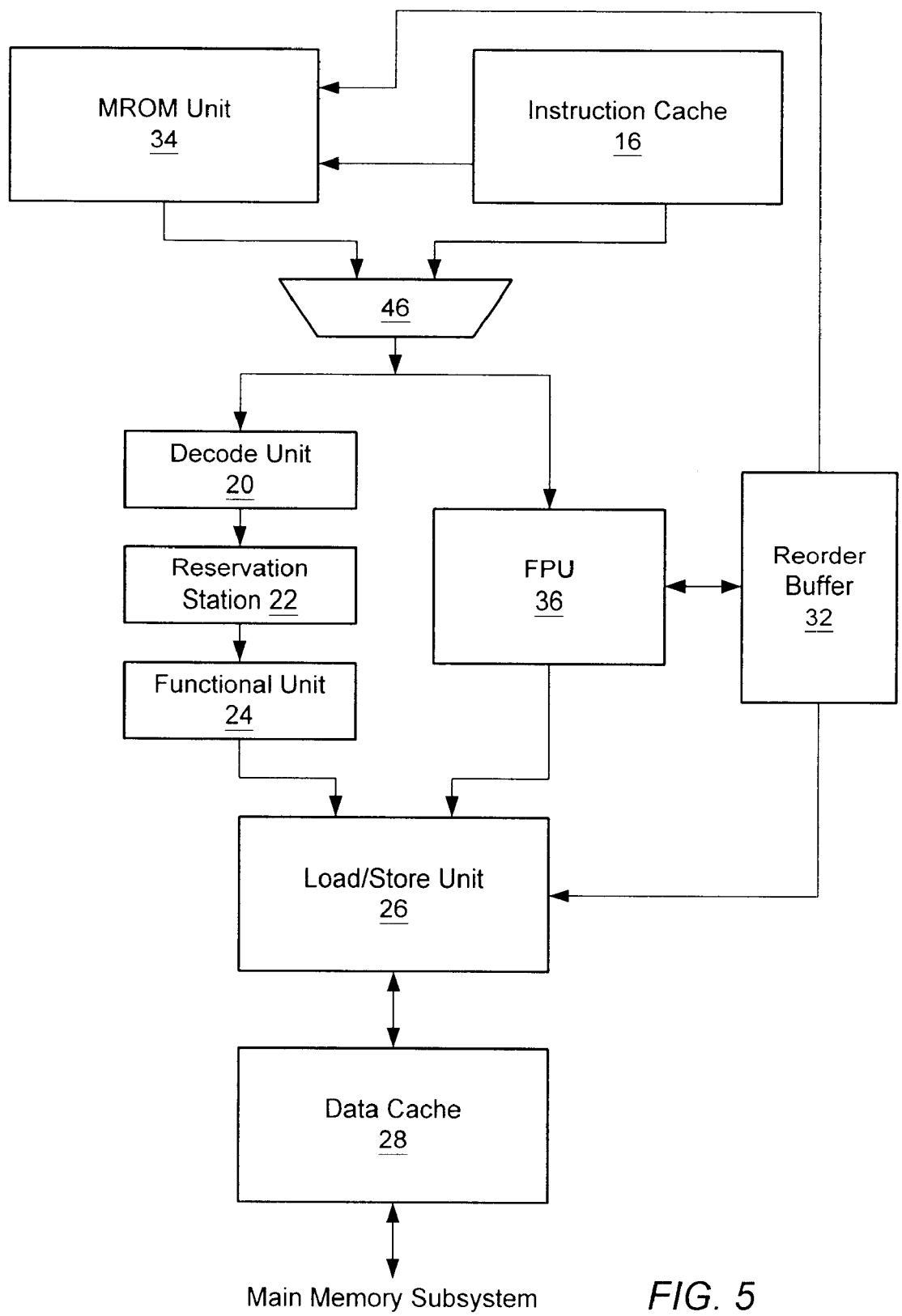
FIG. 5 is a block diagram depicting portions of one embodiment of the microprocessor of FIG. 3.

Turning now to FIG. 5, a block diagram depicting portions of one embodiment of the microprocessor of FIG. 3 is shown. FIG. 5 depicts MROM unit 34, instruction cache 16, multiplexer 46, decode unit 20, reservation station 22, functional unit 24, FPU 36, reorder buffer 32, load/store unit 26, and data cache 28. As indicated in FIG. 5, instruction cache 16 is coupled to MROM unit 34 and multiplexer 46. MROM unit 34 is coupled to multiplexer 46 and reorder buffer 32. Multiplexer 46 is coupled to decode unit 20 and FPU 36. FPU 36 is coupled to reorder buffer 32 and load/store unit 26. Decode unit 20 is coupled to reservation station 22. Reservation station 22 is coupled to functional unit 24. Functional unit 24 is coupled to load/store unit 26. Load/store unit 26 is coupled to data cache 28. Data cache 28 is coupled to a main memory subsystem (not shown).

FIG. 5 depicts an apparatus and method for executing floating-point store instructions. If store data of a floating-point store instruction corresponds to a tiny number and an underflow exception is masked, then a trap routine can be executed to generate corrected store data and complete the store operation. In response to detecting that store data corresponds to a tiny number and the underflow exception is masked, the store data, store address information, and opcode information can be stored prior to initiating the trap routine. The trap routine can be configured to access the store data, store address information, and opcode information. The trap routine can be configured to generate corrected store data and complete the store operation using the store data, store address information, and opcode information.

The use of the apparatus and method for executing floating-point store instructions may provide performance advantages over other systems. Generally speaking, store data corresponds to a tiny number only in rare instances. By executing a trap routine to handle store data that corresponds to a tiny number, the apparatus and method may allow floating-point store instructions to execute in a more efficient manner by generating corrected store data with the trap routine. As a result, the apparatus and method may allow floating-point store instructions whose store data does not correspond to a tiny number to complete in fewer clock cycles.

FPU 36 is configured to receive instructions from MROM unit 34 and instruction cache 16. FIG. 5 depicts multiplexer 46 selecting instructions from MROM unit 34 and instruction cache 16 to convey to FPU 36. In one embodiment, such as the one shown in FIG. 3, MROM unit 34 and instruction cache 16 are configured to convey up to three instructions per clock cycle through a set of multiplexers 46A, 46B, and 46C. Other embodiments may convey other numbers of instructions to FPU 36 in a clock cycle. Instructions from instruction cache 16 may also pass through an instruction alignment unit or early decode unit as shown in FIG. 3 prior to being conveyed to FPU 36.

FPU 36 is configured to receive and execute floating-point store instructions. Generally speaking, floating-point store instructions are instructions configured to store a data value, referred to as "store data", from a register into a memory. In the embodiment in FIG. 5, floating-point store instructions can be configured to convey store data from FPU 36 to load/store unit 26. Load/store unit 26 can then complete a store operation by conveying the store data to a main memory or a cache such as data cache 28. In one embodiment configured to execute x86 and/or x87 instructions, floating-point store instructions can be configured to specify the value at the top of a register stack as a store operand, i.e. store data. x86 and x87 floating-point store instructions include FST and FSTP. FST and FSTP can each store 32-bit or 64-bit store data.

In the embodiment of FIG. 5, the store address of a floating-point store instruction can be calculated in functional unit 24. Other embodiments can calculate the store address in FPU 36 or in other functional units. The store address can be provided to load/store unit 26 which, in turn, can convey the store address and store data to data cache 28 and or a main memory. In one particular embodiment, a floating-point store instruction can be configured as a microcode instruction. In this embodiment, MROM unit 34 can be configured to convey a microinstruction corresponding to the floating-point store instruction to decode unit 20 for execution in functional unit 24 to generate the store address for the store operation. MROM unit 34 can also be configured to convey a microinstruction corresponding to the floating-point store instruction to FPU 36 to generate the store data. As used herein, the term floating-point store instruction can refer to the instruction or microinstruction issued to FPU 36.

In the embodiment of FIG. 5, reorder buffer 32 can be configured to assign a reorder buffer tag to an instruction or set of instructions prior to being issued to reservation station 22 or FPU 36. Instructions can thus be identified and tracked internally by using their reorder buffer tag. As a result, a microinstruction configured to generate a store address corresponding to a floating-point store instruction can convey its reorder buffer tag to load/store unit 26 when it provides the store address. Load/store unit 26 can then correlate the reorder buffer tag of this microinstruction to the reorder buffer tag of the microinstruction configured to generate the store data. Load/store unit 26 can thus detect when it has received both a store address and store data corresponding to a floating-point store instruction.

In the embodiment of FIG. 5, FPU 36 can be configured to convey store data to load/store unit 26 in response to executing a floating-point store instruction. In one specific embodiment, a microinstruction corresponding to a floating-point store instruction is configured to cause FPU 36 to convey the store data. Prior to conveying the store data, FPU 36 can be configured to determine whether the store data corresponds to a tiny number. A tiny number can be defined as a value that is less than the minimum value that can be represented in a given floating-point precision. This occurs when the exponent of a normalized value is less than the minimum exponent of a given precision. For example, the IEEE-754 defines the minimum exponent for a single precision number to be −126. Consequently, a result with an exponent of −130 would be a tiny number for single precision store data.

If the store data does not correspond to a tiny number, then FPU 36 can complete the execution of a floating-point store instruction by conveying the store data to load/store unit 26 and conveying completion information to reorder buffer 32. Reorder buffer 32 can be configured to retire the floating-point store instruction.

If the store data corresponds to a tiny number, FPU 36 can be configured to determine whether an underflow exception is masked. To conform to the IEEE-754 specification, FPU 36 can include an underflow exception mask that can be set or reset by a programmer. If the underflow exception mask is set, i.e. the underflow exception is masked, then the store data may require additional processing prior to being stored in a cache or memory. In one embodiment, the additional processing can include denormalizing, rounding, and renormalizing the store data. Other embodiments can be configured to generate corrected store data in other ways.

If the underflow exception is masked, FPU 36 can be configured to execute a trap routine to handle store data that corresponds to a tiny number. In this case, FPU 36 can be configured to convey a store cancel signal to reorder buffer 32 to cancel a store operation corresponding to the floating-point store instruction. Reorder buffer 32 can convey the store cancel signal to load/store unit 26. Load/store unit 26 can be configured to cancel the store operation corresponding to the floating-point store instruction.

FPU 36 can be configured to convey completion information corresponds to a floating-point store instruction to reorder buffer 32. If the store data of the floating-point store instruction does not correspond to a tiny number or if the underflow exception is not masked, then reorder buffer 32 can be configured to retire the floating-point store instruction by sending a retire signal to FPU 36. If the store data generated by the floating-point store instruction corresponds to a tiny number and the underflow exception is masked, then FPU 36 can be configured to convey a trap signal along with other completion information to reorder buffer 32. Reorder buffer 32, in turn, can be configured to convey an abort signal to FPU 36 in response to retiring the floating-point store instruction and can initiate a trap routine by conveying a trap signal to MROM unit 34. FPU 36 can be configured to execute a trap routine to generate corrected store data.

Figure 6:
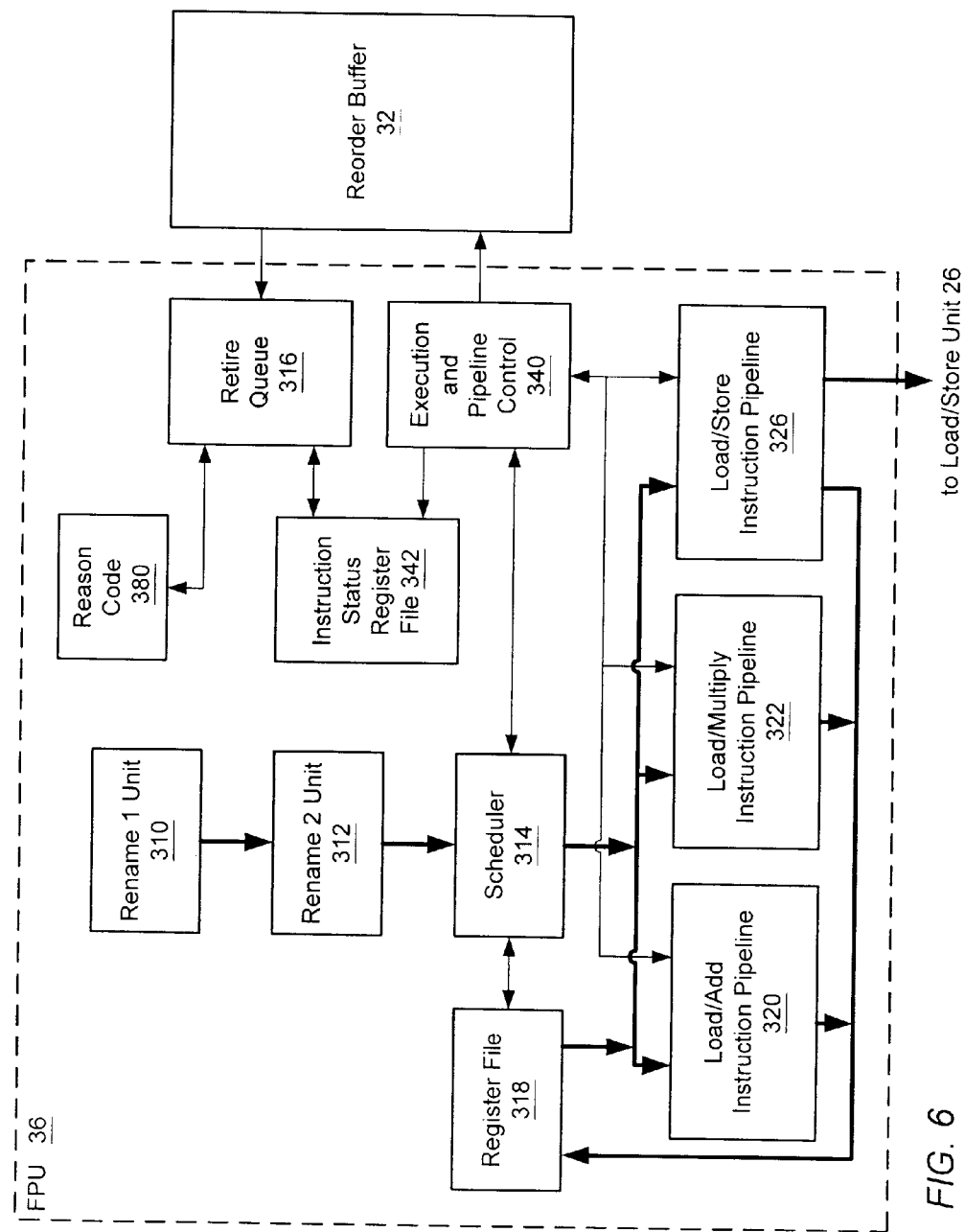
FIG. 6 is a block diagram depicting portions of one embodiment of the microprocessor of FIG. 3.

Turning now to FIG. 6, a block diagram depicting portions of one embodiment of the microprocessor of FIG. 3 is shown. FPU 36 includes register file 318, rename 2 unit 312, scheduler 314, load/add instruction pipeline 320, load/multiply instruction pipeline 322, load/store instruction pipeline 326, execution and pipeline control 340, instruction status register file 342, retire queue 316, architectural register tag file 330, floating-point status/control/tag words 344, and reason code register 380. Load/add instruction pipeline 320, load/multiply instruction pipeline 322, and load/store instruction pipeline 326 can be referred to collectively as the "execution pipelines" or individually as an "execution pipeline." Register file 318 is coupled to scheduler 314 and the execution pipelines. Rename 2 unit 312 is coupled to scheduler 314. Scheduler 314 is coupled to the execution pipelines and execution and pipeline control 340. The execution pipelines are coupled to execution and pipeline control 340. Execution and pipeline control 340 is coupled to reorder buffer 32 and instruction status register file 342. Retire queue 316 is coupled to instruction status register file 342, reorder buffer 32, architectural register tag file 330 floating-point status/control/tag words 344, and reason code register 380.

Figure 8:
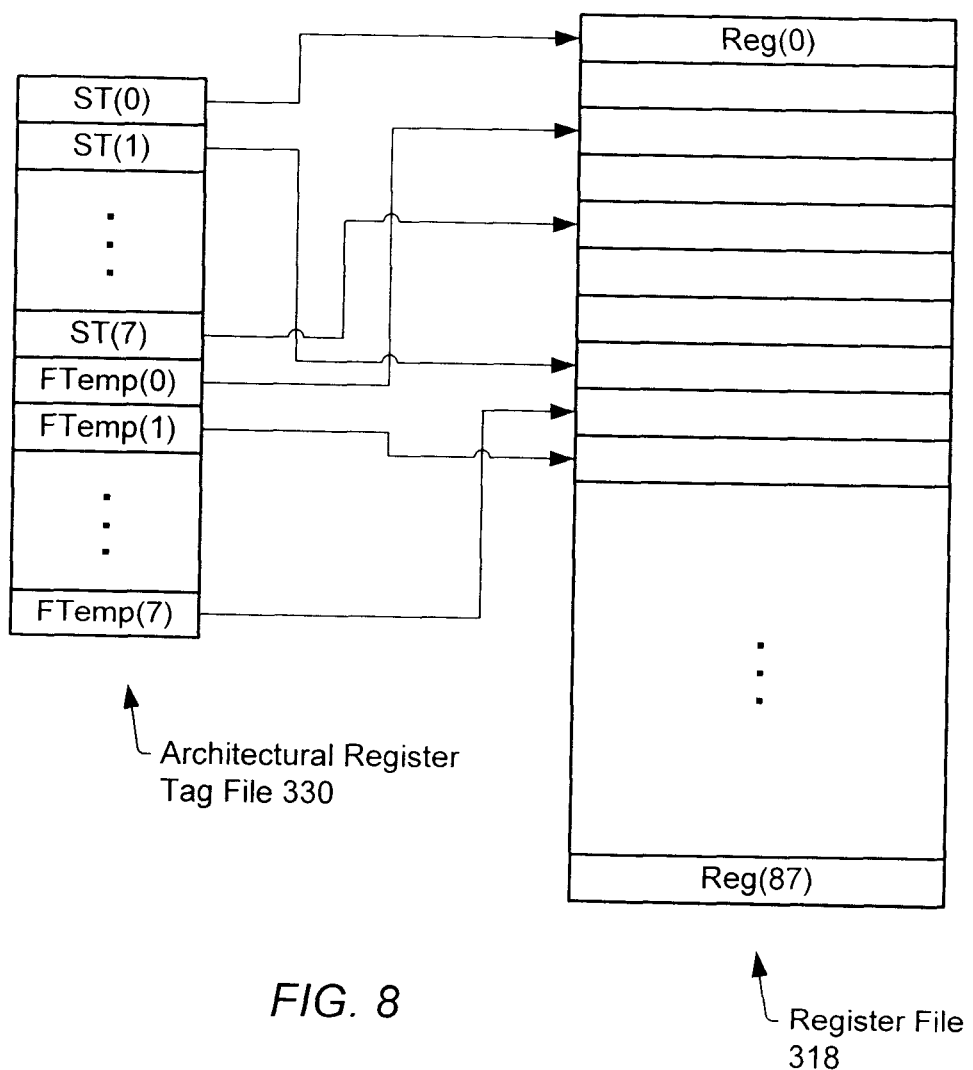
FIG. 8 is a block diagram depicting one embodiment of a register tag file and one embodiment of a register file.

The execution of a floating-point store instruction in FPU 36 will now be described. A floating-point store instruction can be received in rename 1 unit 310. Rename 1 unit 310 can be configured to assign a designated absolute register number as a destination register of a floating-point store instruction. In one embodiment, rename 1 unit 310 can be configured to assign register Ftemp(0) as the destination register of each floating-point store instruction. FTemp(0) can represent microarchitectural register 0 as shown in FIG. 8. Other embodiments can be configured to assign other registers as the destination register. Rename 1 unit 310 can convey the floating-point store instruction and the designated absolute register number to rename 2 unit 312.

Rename 2 unit 312 can be configured to receive the floating-point store instruction and the designated absolute register number assigned as the destination register by rename 1 unit 310. Rename 2 unit 312 can be configured to assign a destination register tag to the designated absolute register number as described above in FIG. 4. Rename 2 unit 312 can be configured to convey the floating-point store instruction to scheduler 314. Scheduler 314 can be configured to receive the floating-point store instruction and convey it to load/store instruction pipeline 326 for execution.

Load/store instruction pipeline 326 can be configured to execute the floating-point store instruction. Load/store instruction pipeline 326 can be configured to detect that the store data of a floating-point store instruction corresponds to a tiny number. If the store data corresponds to a tiny number, load/store instruction pipeline 326 can be configured to determine whether an underflow exception is masked. If the underflow exception is masked, load/store instruction pipeline 316 can be configured to send a masked tiny signal to execution and pipeline control unit 340 indicate that the store data corresponds to a tiny number and that the underflow exception is masked. Load/store instruction pipeline 340 can also be configured to write the store data to the register in register file 318 corresponding to the destination register tag assigned in remane 2 unit 312.

Execution and pipeline control unit 340 can be configured to convey completion information corresponding to the floating-point store instruction to reorder buffer 32. In response to receiving a masked tiny signal from load/store instruction pipeline 326, execution and pipeline control 340 can convey a trap signal corresponding to the floating-point store instruction to reorder buffer 32 as part of the completion information. Execution and pipeline control 340 can also convey a store cancel signal to reorder buffer 32. Reorder buffer 32 can convey the store cancel signal to load/store unit 26. Load/store unit 26 can cancel a store operation corresponding to the floating-point store instruction in response to receiving the store cancel signal. Execution and pipeline control 340 can be configured to store status data corresponding to the floating-point store instruction in instruction status register file 342. The status data can indicate that the store data corresponds to a tiny number and that the underflow exception is masked. In one embodiment, FPU 36 can include a plurality of condition codes such as condition codes C3, C2, C1, and C0 found in x86 microprocessors. In this embodiment, the status data can include update information for each of the condition codes. In one particular embodiment, the update information for each condition code can include 2 bits that are encoded as follows:

00 pass through the old condition code bit value
01 set the condition code bit
10 clear the condition code bit
11 store data corresponds to a tiny number and the underflow exception is masked By storing the update information for the condition codes, retire queue 316 can detect that the store data corresponds to a tiny number and that the underflow exception is masked based on the C3 update information as will be described below. Other embodiments can detect that the store data corresponds to a tiny number and that the underflow exception is masked in other ways.

Reorder buffer 32 can be configured to receive the trap signal and the cancel signal from execution and pipeline control 340. In response to retiring the instruction, reorder buffer 32 can be configured to convey an abort signal corresponding to the trap signal to retire queue 316. Reorder buffer 32 can also be configured to initiate a trap routine corresponding to the trap signal.

In response to receiving an abort signal, retire queue 316 can be configured to retire the floating-point store instruction. Retire queue 316 can be configured to read the status data corresponding to the floating-point store instruction from instruction status register file 342. In response to determining that the store data corresponds to a tiny number and that the underflow exception is masked, retire queue 316 can be configured to set a store exception bit in reason code register 380. In one particular embodiment, retire queue 316 can be configured to determine that the store data corresponds to a tiny number and that the underflow exception is masked by detecting that the C3 bit update information is '11' as discussed above. Retire queue 316 can also be configured to store other information corresponding to the floating-point store instruction in reason code register 380 and in architectural register tag file 330 and floating-point status/control/tag words 344 shown in FIG. 4.

Once the instruction has been retired, a trap routine can be initiated. In one embodiment, a trap routine can include a plurality of microcode instructions. In other embodiments, a trap routine can include hardware or other software mechanisms. The trap routine can be configured to detect that the store exception bit in reason code register 380 has been set. In response, the trap routine can be configured to generate corrected store data and complete the operation of the floating-point store instruction that caused the trap. The trap routine can be configured to read the store data from the destination register of the floating-point store instruction using the designated absolute register number. In one embodiment, as discussed above, the trap routine can read the store data from a register corresponding to FTemp(0).

In one embodiment, the corrected store data can conform to the IEEE-754 standard. Accordingly, the corrected store data can correspond to either a zero value, a denormal value, or the smallest normalized value that can be represented by the floating-point precision of the floating-point store instruction. In one embodiment, the trap routine can be configured to generate the corrected store data by denormalizing, rounding, and renormalizing the store data. More specifically, the mantissa of the store data can be right shifted by a number of bit positions equal to the difference between the exponent of the store data and the minimum exponent of the floating-point precision. This difference can be added to the exponent of the store data. The mantissa of the store data can then be rounded according to a rounding scheme. Once rounded, the denormalized and rounded store data can be renormalized. In this manner, the trap routine can generate corrected store data that conforms to the IEEE-754 standard. Once the store data has been converted, the trap routine can be configured to store the corrected store data at the store address by conveying the corrected store data to load/store unit 26 as shown in FIG. 5, and an instruction subsequent to the floating-point store instruction that caused the trap can be restarted.

In order to properly convert the store data and store the corrected store data, the trap routine needs to access several pieces of information. The trap routine needs the store data, the store address, and the type of store to be performed. As noted above, store data that corresponds to a tiny number where the underflow exception is masked can be stored in a register corresponding to a designated absolute register number such as FTemp(0). Consequently, the trap routine can read the store data from this register. The trap routine can then generate the corrected store data using the store data and convey the corrected store data to load/store unit 26 as shown in FIG. 5.

In one embodiment, the trap routine needs several pieces of information to generate the store address. The information can include the segment register number, the segment register value, and the segment register offset. Accordingly, the segment register number, the segment register value, and the segment register offset can be stored such that the trap routine can access this information. In one embodiment, the segment register number, the segment register value, and the segment register offset can be stored in response to reorder buffer 32 retiring the floating-point store instruction. In this embodiment, the trap routine can access the segment register number, the segment register value, and the segment register offset in order to generate the store address. The trap routine can provide the store address to load/store unit 26, as shown in FIG. 5, along with the store data to accomplish the store. One embodiment configured to store the segment register number, the segment register value, and the segment register offset will be described in FIG. 7.

The trap routine also needs to detect the type of store to be performed. Accordingly, opcode information corresponding to the floating-point store instruction can be stored. In one embodiment, opcode information corresponding to the floating-point store instruction can be stored in response to reorder buffer 32 retiring the floating-point store instruction. In this embodiment, the trap routine can access the opcode information to determine what type of store needs to be performed. In one particular embodiment, the trap routine can be configured to determine the floating-point precision of the store data using the opcode information. For example, in one embodiment where FPU 36 is configured to execute x86/x87 instructions, the instructions FST and FSTP can store either 32 bit or 64 bit store data. Accordingly, the opcode information can inform the trap routine of the floating-point precision of the store data. The trap routine can generate the corrected store data based on the floating-point precision of the store data.

Figure 7:
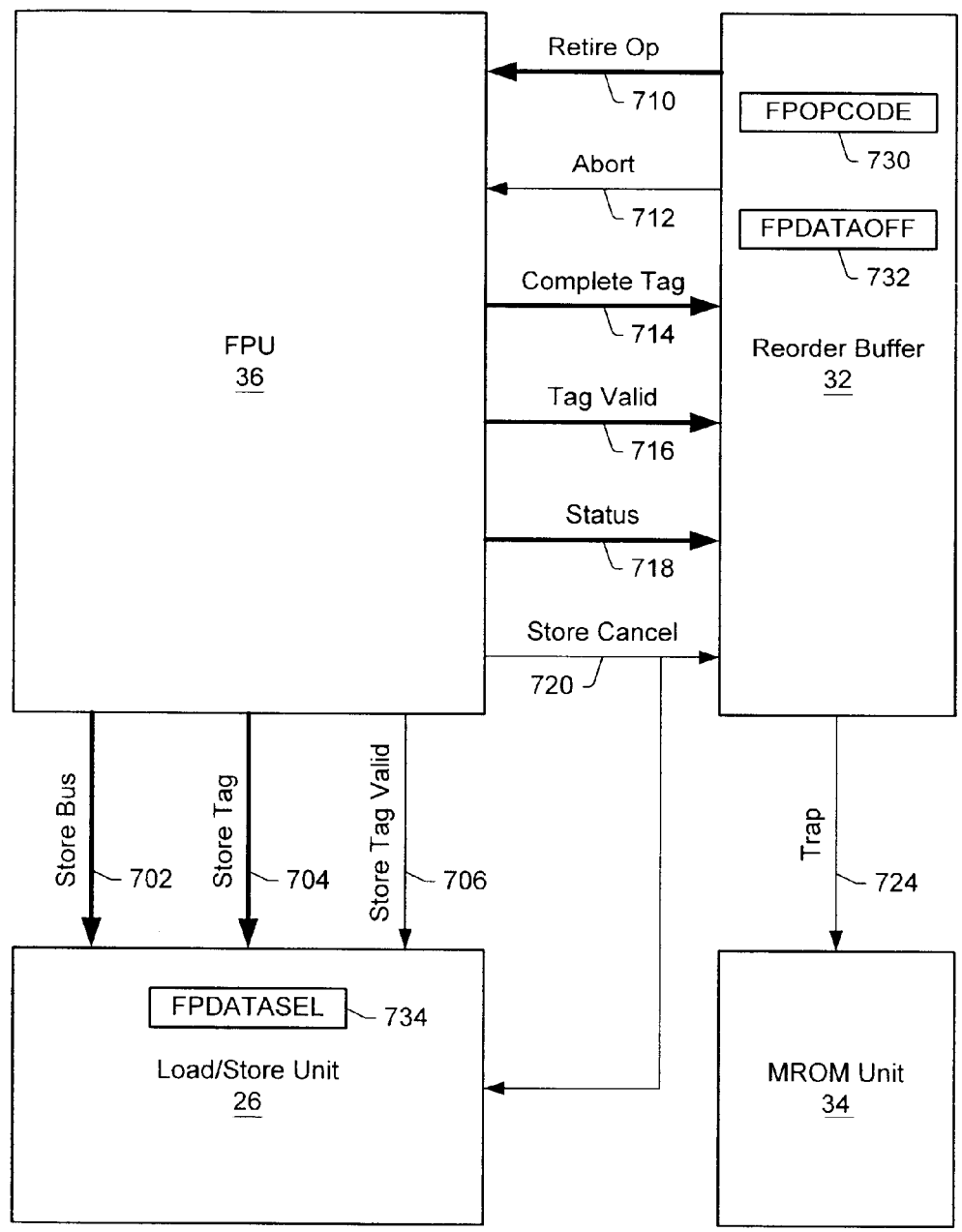
FIG. 7 is a block diagram depicting portions of one embodiment of the microprocessor of FIG. 3.

Turning now to FIG. 7, a block diagram depicting portions of one embodiment of the microprocessor of FIG. 3 is shown. Other embodiments are possible and contemplated. Other connections are possible and contemplated. FIG. 7 depicts FPU 36, load/store unit 26, reorder buffer 32, and MROM unit 34. As shown in FIG. 7, FPU 36 is coupled to load/store unit 26 via store bus 702, store tag 704, store tag valid 706, and store cancel 720. FPU 36 is coupled to reorder buffer 32 via retire op 710, abort 712, complete tag 714, tag valid 716, status 718, and store cancel 720. MROM unit 34 is coupled to reorder buffer 32 via trap 724. In the embodiment of FIG. 7, load/store unit 26 includes FPDATASEL register 734 and reorder buffer 32 includes FPOPCODE register 730 and FPDATAOFF register 732. In other embodiments, FPDATASEL register 734, FPOPCODE register 730, and FPDATAOFF register 732 can be included in other functional units.

In the embodiment of FIG. 7, FPU 36 can be configured to send and receive signals from load/store unit 26 and reorder buffer 32 in response to executing a floating-point store instruction. FPU 36 can be configured to convey a store tag and store data to load/store unit 26 by way of store tag 704 and store bus 702, respectively. FPU 36 can also be configured to convey completion information including an instruction tag and instruction status information to reorder buffer 32 by way of complete tag 714 and status 718. FPU 36 can also be configured to convey a store tag valid signal to load/store unit 26 by way of store tag valid 706 and an instruction tag valid to reorder buffer 32 by way of tag valid 716. Reorder buffer 32 can be configured to convey retirement information corresponding to an instruction to FPU 36 by way of retire op 710 and abort 712. FPU 36 can be configured to convey a store cancel signal to load/store unit 26 and reorder buffer 32 by way of store cancel 720. In one embodiment, not shown, reorder buffer 32 can be configured to convey the store cancel signal to load/store unit 26.

FPU 36 can be configured to convey a store tag corresponding to a floating-point store instruction to load/store unit 26 via store tag 704. If the store data corresponding to the floating-point store instruction does not correspond to a tiny number, then FPU 36 can convey the store data to load/store unit 26 via store bus 702. FPU 36 can also convey a store tag valid signal to load/store unit 26 via store tag valid 706. FPU 36 can also convey a store tag valid signal to load/store unit 26 via store tag valid 706.

In response to a floating-point store instruction completing execution in FPU 36, FPU 36 can convey an instruction tag, an instruction tag valid signal, and status information corresponding to the floating-point store instruction to reorder buffer 32 via complete tag 714, tag valid 716, and status 718, respectively. In one embodiment, the instruction tag corresponds to a reorder buffer tag assigned by reorder buffer 32. In other embodiments, the instruction tag can correspond to an address or another type of tag. Upon retirement, reorder buffer 32 can be to configured to convey a retire signal to FPU 36 via retire op 710. FPU 36 can be configured to retire the floating-point store instruction in response to receiving a retire signal corresponding to the floating-point store instruction from reorder buffer 32.

If the store data corresponding to the floating-point store instruction corresponds to a tiny number, then FPU 36 can be configured to cancel the store operation corresponding to the floating-point store instruction and initiate a trap routine to generate corrected store data. FPU 36 can be configured to convey a store cancel signal to load/store unit 26 and reorder buffer 32 via store cancel 720. FPU 36 can also be configured to convey a trap signal via status 818 to reorder buffer 32. In response to receiving a store cancel signal, load/store unit 26 can be configured to store information in FPDATASEL register 734. This information can include a value of an address segment register and an address segment register identifier that corresponds to the floating-point store instruction. The trap routine can later use the value of the address segment register and the address segment register identifier, along with other information, to generate the store address of the floating-point store instruction.

In response to retiring the floating-point store instruction, reorder buffer 32 can be configured to convey an abort signal via abort 712 along with the retire signal corresponding to the floating-point store instruction via retire op 710. Reorder buffer 32 can also be configured to store an address offset corresponding to the floating-point store instruction in FPDATAOFF register 732 and opcode information corresponding to the floating-point store instruction in FPOPCODE register 733. The trap routine can use the address offset along with the value of the address segment register and the address segment register identifier stored in FPDATASEL register 734 to generate the store address of the floating-point store instruction. The trap routine can use the opcode information to identify the type of store to be performed. The type of store to be performed can be used to identify the floating-point precision of the store data.

In response to receiving an abort signal, FPU 36 can be configured to abort instructions subsequent to the aborted floating-point store instruction. Reorder buffer 32 can be configured to initiate the trap routine by conveying a signal via trap 724 to MROM unit 34. FPU 36 can be configured to execute the trap routine to convert the store data to corrected store data and convey the corrected store data to load/store unit 26 via store bus 702 as described above in FIG. 6.

Turning now to FIG. 8, a block diagram depicting one embodiment of a register tag file and one embodiment of a register file is shown. Architectural register tag file 330 and register file 318 are depicted. In the embodiment of FIG. 8, architectural register tag file 330 includes sixteen register tags and register file 318 includes 88 registers, Reg(0) through Reg(87). The sixteen register tags include pointers to eight stack registers, ST(0) through ST(7), and eight microprocessor temporary registers, FTemp(0) through FTemp(7). In one embodiment, the microprocessor temporary registers are not accessible by the programmer and can be accessed only by microcode. Other numbers or configurations of register tags and/or registers are possible and contemplated.

In the embodiment shown in FIG. 8, architectural register tag file 330 includes sixteen seven-bit register tags. The register tags each identify a register in register file 318. For example, the register tag corresponding to ST(0) identifies or points to Reg(0) as indicated by the arrow in FIG. 8. Other register tags identify other registers in register file 318 in a similar fashion. The use register tags that correspond to architectural registers may allow for expedited register renaming. Tag future file 328 may be configured in a manner similar to the embodiment of architectural register tag file 330 shown in FIG. 8.

With regard to the execution of floating-point store instructions, a designated architectural register can be assigned as a destination register of a floating-point store instruction. In one embodiment, FTemp(0) is assigned as the destination register of all floating-point store instructions. Other embodiments may designate other architectural registers for this purpose. In this embodiment, the store data corresponding to a floating-point store instruction can be copied to the register in register file 318 identified the by register tag corresponding to FTemp(0) if the store data corresponds to a tiny number and the underflow exception is masked. If this occurs, a trap routine can later read the store data from the register in register file 318 associated with FTemp(0) to generate the corrected store data.

Figure 9A:
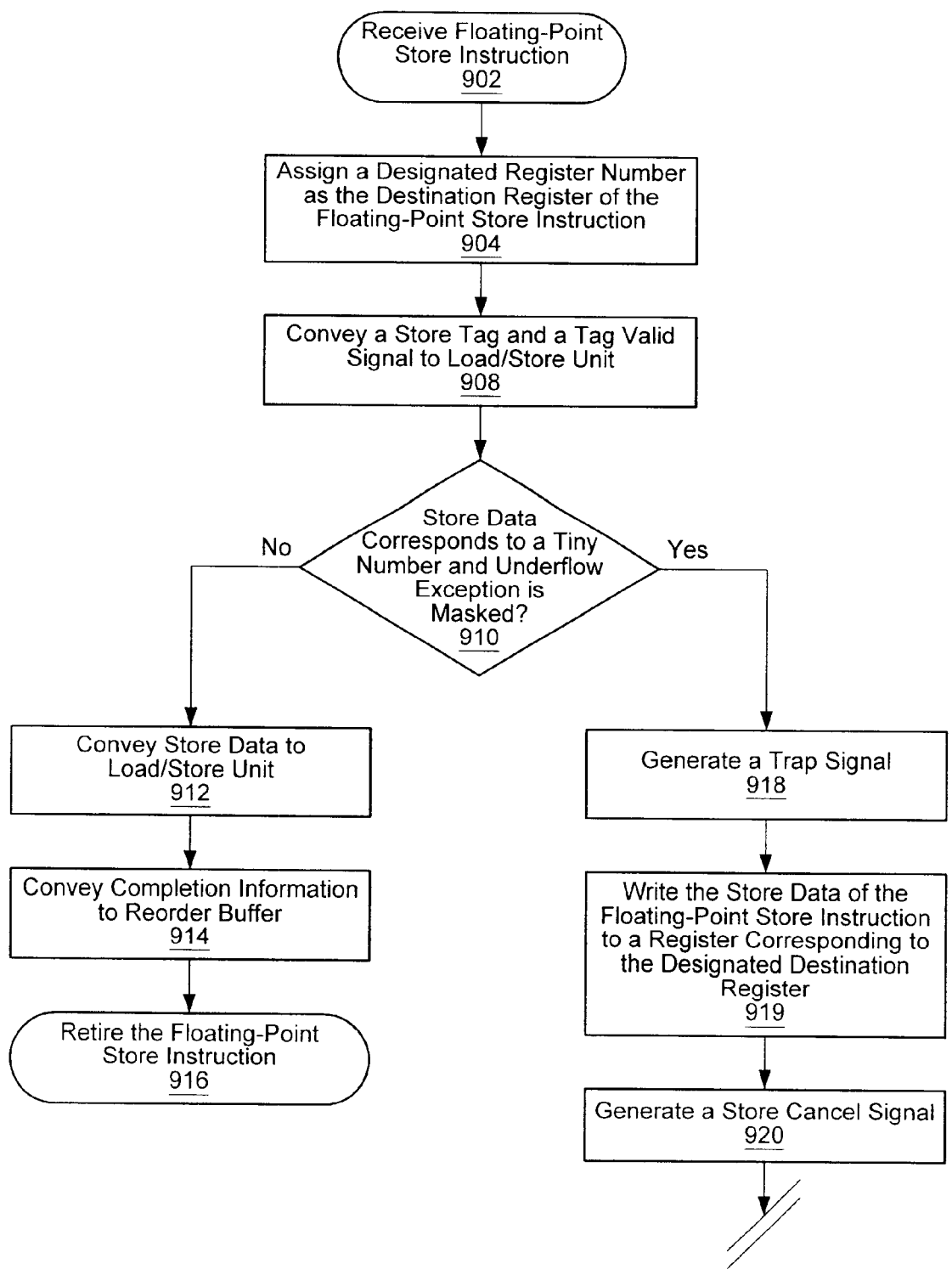
FIG. 9A is a first portion of a chart depicting a method for executing a floating-point store instruction.
Figure 9B:
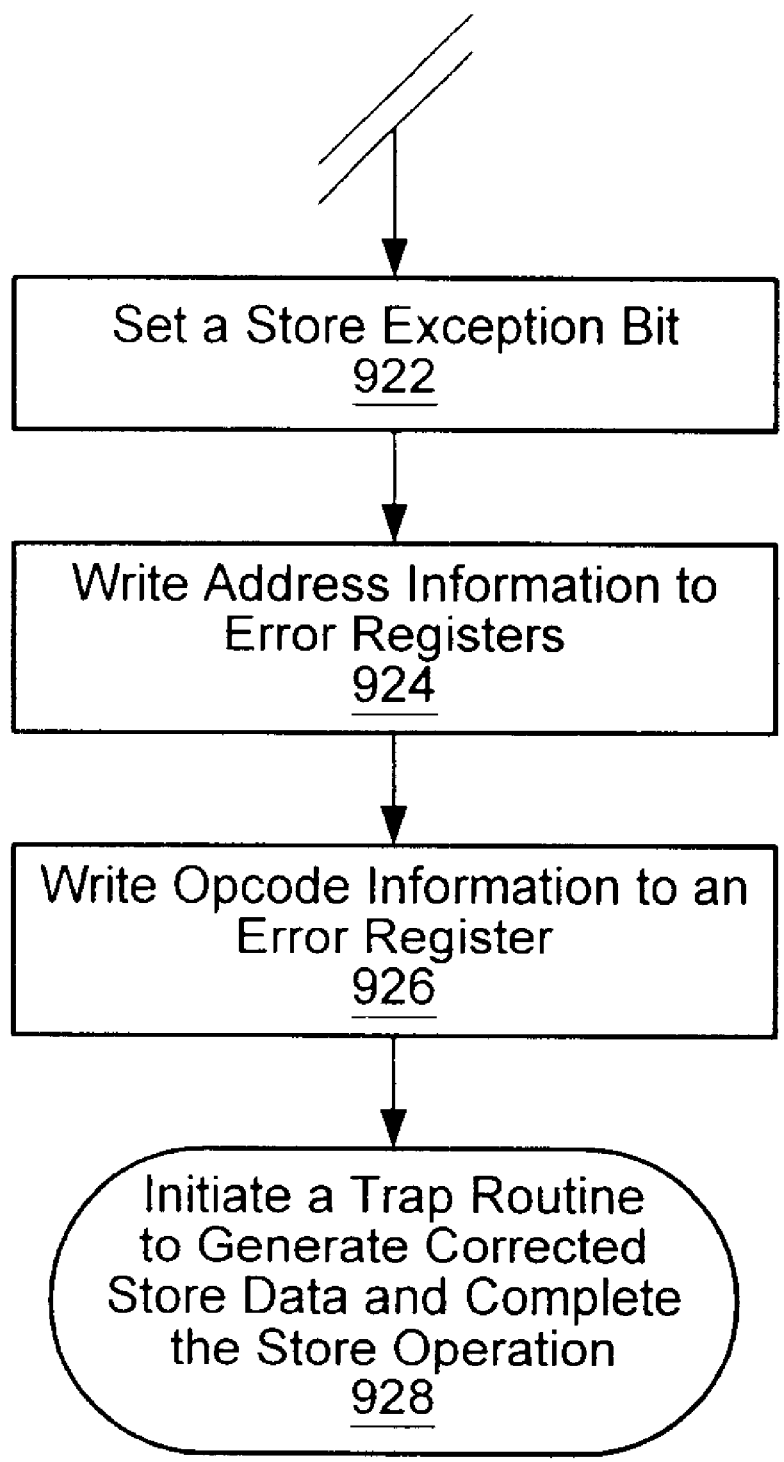
FIG. 9B is a second portion of a chart depicting a method for executing a floating-point store instruction.

Turning now to FIGS. 9A and 9B, first and second portions of a chart depicting a method for executing a floating-point store instruction. Variations of the method shown are possible and contemplated. Block 902 indicates receiving a floating-point store instruction. Block 904 indicates assigning a designated register number as a destination register of the floating-point store instruction. In one embodiment, the designated destination register number can correspond to FTemp(0) as shown in FIG. 8. Block 908 indicates conveying a store tag and a tag valid signal to a load/store unit.

In block 910, a determination can be made as to whether the store data corresponds to a tiny number and an underflow exception is masked. If the store data does not correspond to a tiny number or the underflow exception is not masked, block 912 indicates conveying the store data to a load/store unit. Block 914 indicates conveying completion information to a reorder buffer, and block 916 indicates retiring the floating-point store instruction.

If the store data does correspond to a tiny number and the underflow exception is masked, block 918 indicates generating a trap signal. Block 919 indicates writing the store data of the floating-point store instruction to a register corresponding to the designated destination register number. Block 920 indicates generating a store cancel signal. The store cancel signal can be conveyed to a load/store unit. In response to receiving the store cancel signal, the load/store unit can be configured to cancel a store operation corresponding to the floating-point store instruction. Block 922 indicates setting a store exception bit. Block 924 indicates writing address information to error registers. The address information can include an address segment register value, an address segment register identifier, and an address offset. Block 926 indicates writing opcode information to an error register. Block 928 indicates initiating a trap routine to generate corrected store data and complete the store operation.

Figure 10:
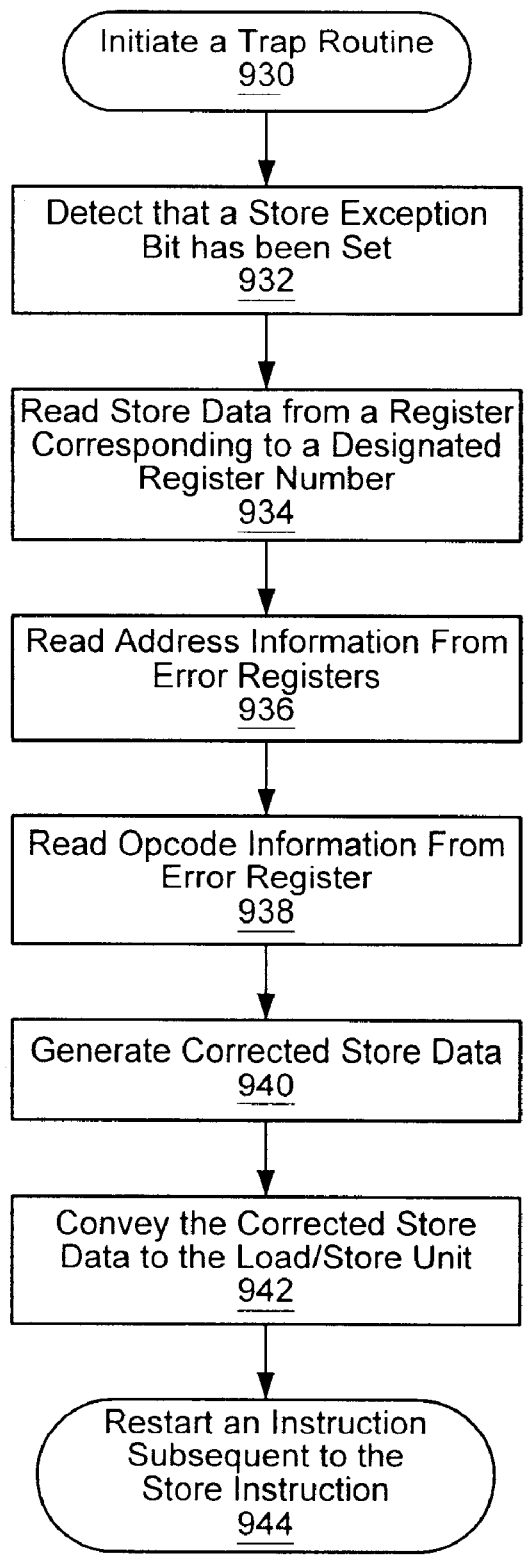
FIG. 10 is a chart depicting a method for executing a trap routine to generate corrected store data and complete a store operation.

Turning now to FIG. 10, a chart depicting a method for executing a trap routine to generate corrected store data and complete a store operation is shown. Variations of the method shown are possible and contemplated. Block 930 indicates initiating a trap routine. Block 932 indicates detecting that a store exception bit has been set. Block 934 indicates reading the store data from a register corresponding to a designated register number. Block 936 indicates reading address information from error registers. Block 938 indicates reading opcode information from an error register. Block 940 indicates generating corrected store data. Generating corrected store data can include denormalizing, rounding, and renormalizing the store data to result in the corrected store data. Block 942 indicates conveying the corrected store data to the load/store unit. Block 944 indicates restarting an instruction subsequent to the store instruction.

Figure 11:
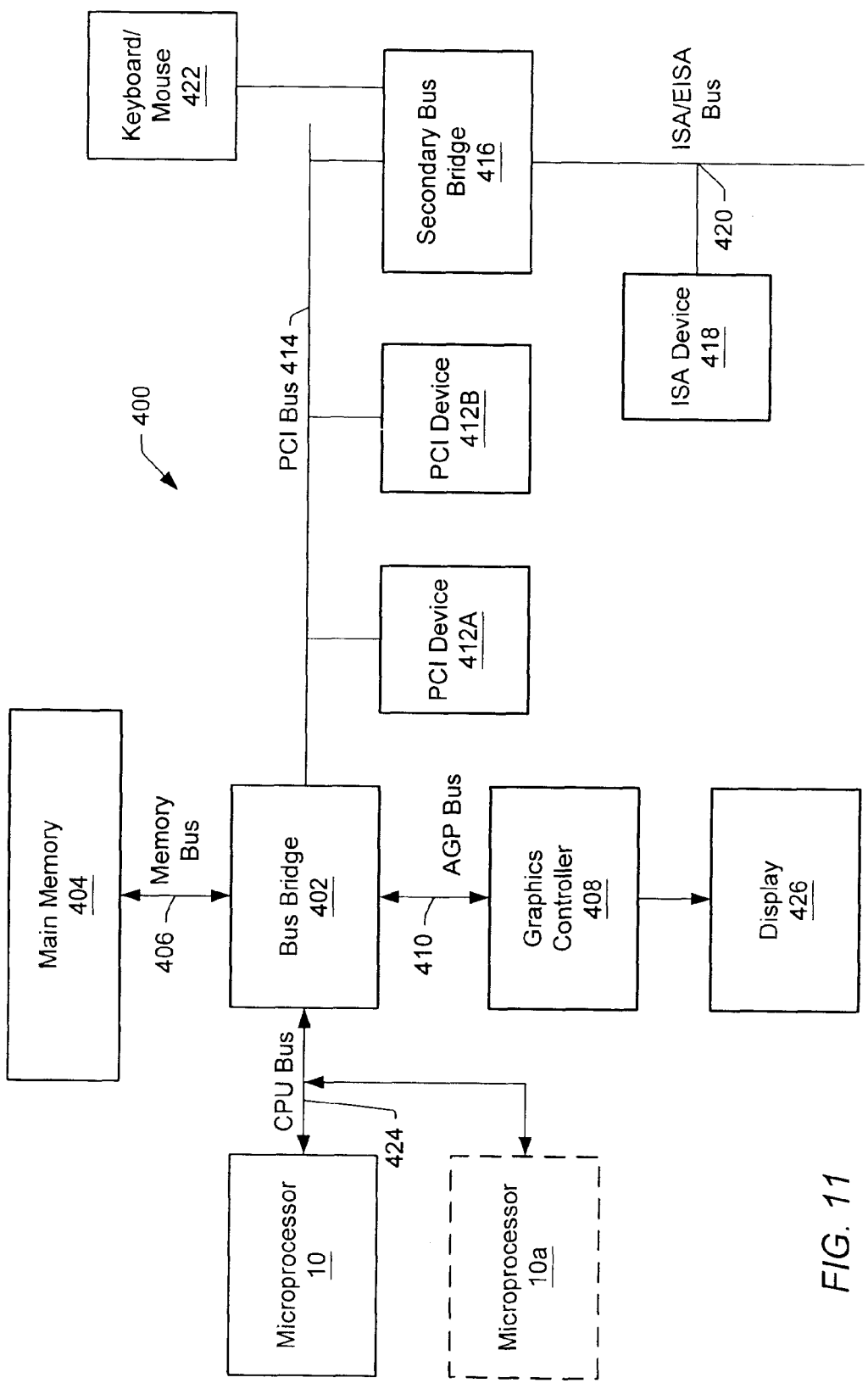
FIG. 11 is a block diagram of one embodiment of a computer system configured to utilize the microprocessor of FIG. 3.

Turning now to FIG. 11, a block diagram of one embodiment of a computer system 400 including microprocessor 10 is shown. Microprocessor 10 is coupled to a variety of system components through a bus bridge 402. Other embodiments are possible and contemplated. In the depicted system, a main memory 404 is coupled to bus bridge 402 through a memory bus 406, and a graphics controller 408 is coupled to bus bridge 402 through an AGP bus 410. Finally, a plurality of PCI devices 412A–412B are coupled to bus bridge 402 through a PCI bus 414. A secondary bus bridge 416 may further be provided to accommodate an electrical interface to one or more EISA or ISA devices 418 through an EISA/ISA bus 420. Microprocessor 10 is coupled to bus bridge 402 through a CPU bus 424.

Bus bridge 402 provides an interface between microprocessor 10, main memory 404, graphics controller 408, and devices attached to PCI bus 414. When an operation is received from one of the devices connected to bus bridge 402, bus bridge 402 identifies the target of the operation (e.g. a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus.

In addition to providing an interface to an ISA/EISA bus for PCI bus 414, secondary bus bridge 416 may further incorporate additional functionality, as desired. For example, in one embodiment, secondary bus bridge 416 includes a master PCI arbiter (not shown) for arbitrating ownership of PCI bus 414. An input/output controller (not shown), either external from or integrated with secondary bus bridge 416, may also be included within computer system 400 to provide operational support for a keyboard and mouse 422 and for various serial and parallel ports, as desired. An external cache unit (not shown) may further be coupled to CPU bus 424 between microprocessor 10 and bus bridge 402 in other embodiments. Alternatively, the external cache may be coupled to bus bridge 402 and cache control logic for the external cache may be integrated into bus bridge 402.

Main memory 404 is a memory in which application programs are stored and from which microprocessor 10 primarily executes. A suitable main memory 404 comprises DRAM (Dynamic Random Access Memory), and preferably a plurality of banks of SDRAM (Synchronous DRAM).

PCI devices 412A–412B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem, a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures which can be effectively shifted into and from main memory 404. Graphics controller 408 may therefore be a master of AGP bus 410 in that it can request and receive access to a target interface within bus bridge 402 to thereby obtain access to main memory 404. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 400 may be a multiprocessing computer system including additional microprocessors (e.g. microprocessor 10a shown as an optional component of computer system 400). Microprocessor 10a may be similar to microprocessor 10. More particularly, microprocessor 10a may be an identical copy of microprocessor 10. Microprocessor 10a may share CPU bus 424 with microprocessor 10 or may be connected to bus bridge 402 via an independent bus.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

We claim:

1. A floating-point execution unit comprising:
an execution pipeline, wherein said execution pipeline is configured to execute a floating-point store instruction, wherein said floating-point store instruction specifies store data and a store address, wherein said execution pipeline is configured to detect that said store data corresponds to a tiny number and an underflow exception is masked;
a retire queue coupled to said execution pipeline, wherein said retire queue is configured to set a store exception bit if said store data corresponds to a tiny number and said underflow exception is masked; and
a control unit coupled to said execution pipeline and said retire queue, wherein said control unit is configured to generate a trap signal and a store cancel signal if said store data corresponds to a tiny number and said underflow exception is masked, wherein said store cancel signal indicates that a store operation corresponding to said floating-point store instruction should be canceled;
wherein said execution pipeline is configured to store said store data in a register corresponding to a designated register number if said store data corresponds to a tiny number and said underflow exception is masked, wherein said execution pipeline is configured to execute a trap routine in response to said trap signal, and wherein said trap routine is configured to read said store data from said register and generate corrected store data in response to said store exception bit being set.

2. The floating-point execution unit of claim 1 further comprising:
an error register coupled to said execution pipeline, wherein said error register is configured to store opcode information corresponding to said floating-point store instruction;
wherein said trap routine is configured to generate said corrected store data based on said opcode information.

3. The floating-point execution unit of claim 1 further comprising:
one or more error registers coupled to said execution pipeline, wherein said one or more error registers are configured to store address information corresponding to said store address;
wherein said trap routine is configured to generate said store address based on said address information.

4. The floating-point execution unit of claim 3, wherein said address information includes a segment register value, a segment register identifier, and an offset.

5. The floating-point execution unit of claim 1 further comprising:
a status register file coupled to said control unit and said retire queue, wherein said status register file is configured to store status data corresponding to said floating-point store instruction, and wherein said status data is configured to indicate that said store data corresponds to a tiny number and said underflow exception is masked.

6. The floating-point execution unit of claim 5, wherein said retire queue is configured to read said status data, and wherein said retire queue is configured to set said store exception bit if said status data indicates that said store data corresponds to a tiny number and said underflow exception is masked.

7. The floating-point execution unit of claim 6, wherein said status data includes condition code update information, and wherein said control unit is configured to set said condition code update information to a first value if said store data corresponds to a tiny number and said underflow exception is masked.

8. The floating-point execution unit of claim 1, further comprising:
a register rename unit coupled to said execution pipeline, wherein said register rename unit is configured to assign said designated register number to said floating-point store instruction.

9. A method for executing a floating-point store instruction comprising:
receiving a floating-point store instruction, wherein said floating-point store instruction specifies store data and a store address;
assigning a designated register number to said floating-point store instruction;
determining whether said store data corresponds to a tiny number;
determining whether an underflow exception is masked; and
if said store data corresponds to a tiny number and said underflow exception is masked:
canceling a store operation corresponding to said floating-point store instruction;
generating a trap signal;
writing said store data to a register corresponding to said designated register number;
setting a store exception bit;
initiating a trap routine;
generating corrected store data; and completing said store operation corresponding to said floating-point store instruction in response to said generating corrected store data.

10. The method of claim 9, further comprising:

writing opcode information to an error register; and generating corrected store data based on said opcode information.

11. The method of claim 9, further comprising:

writing address information to one or more error registers;

generating said store address based on said address information.

12. The method of claim 11, wherein said address information includes a segment register value, a segment register identifier, and an offset.

13. The method of claim 9, further comprising:

if said store data does not correspond to a tiny number:

conveying said store data to be stored;

completing said floating-point store instruction; and retiring said floating-point store instruction.

14. The method of claim 9, further comprising:

conveying a store tag to a load/store unit;

if said store data corresponds to a tiny number and said underflow exception is masked:

generating a store cancel signal; and conveying said store cancel signal to said load/store unit.

15. A microprocessor comprising:

a reorder buffer;

a load/store unit coupled to said reorder buffer; and a floating-point execution unit coupled to said reorder buffer and said load/store unit, wherein said floating-point execution unit includes:

an execution pipeline, wherein said execution pipeline is configured to execute a floating-point store instruction, wherein said floating-point store instruction specifies store data and a store address, wherein said execution pipeline is configured to detect that said store data corresponds to a tiny number and an underflow exception is masked;

a retire queue coupled to said execution pipeline, wherein said retire queue is configured to set a store exception bit if said store data corresponds to a tiny number and said underflow exception is masked; and a control unit coupled to said execution pipeline and said retire queue, wherein said control unit is configured to convey a trap signal to said reorder buffer if said store data corresponds to a tiny number and said underflow exception is masked;

wherein said execution pipeline is configured to store said store data in a register corresponding to a designated register number if said store data corresponds to a tiny number and said underflow exception is masked, wherein said execution pipeline is configured to execute a trap routine in response to said trap signal, wherein said trap routine is configured to read said store data from said register and generate corrected store data in response to said store exception bit being set, and wherein said execution pipeline is configured to convey said corrected store data to said load/store unit;

wherein said floating-point execution unit is configured to generate a store cancel signal indicating that a store operation corresponding to said floating-point store instruction should be cancelled if said store data corresponds to a tiny number and said underflow exception is masked.

16. The microprocessor of claim 15, wherein said reorder buffer includes an error register, wherein said error register is configured to store opcode information corresponding to said floating-point store instruction, and wherein said trap routine is configured to generate said corrected store data based on said opcode information.

17. The microprocessor of claim 15, wherein said reorder buffer includes a first error register, wherein said load/store unit includes a second error register, wherein said first error register and said second error register are configured to store address information corresponding to said store address, and wherein said trap routine is configured to generate said store address based on said address information.

18. The microprocessor of claim 17, wherein said address information includes a segment register value, a segment register identifier, and an offset, wherein said first error register is configured to store said offset, and wherein said second error register is configured to store said segment register value and said segment register identifier.

19. The microprocessor of claim 15, wherein said floating-point execution unit is configured to convey a store tag corresponding to said floating-point store instruction to said load/store unit, wherein said floating-point execution unit is configured to convey the store cancel signal to said load/store unit if said store data corresponds to a tiny number and said underflow exception is masked.

20. The microprocessor of claim 15, further comprising:

an MROM unit coupled to said reorder buffer;

wherein said reorder buffer is configured to initiate said trap routine by conveying a trap routine signal to said MROM unit.

21. A computer system, comprising:

a microprocessor including:

a reorder buffer;

a load/store unit coupled to said reorder buffer; and a floating-point execution unit coupled to said reorder buffer and said load/store unit, wherein said floating-point execution unit includes:

an execution pipeline, wherein said execution pipeline is configured to execute a floating-point store instruction, wherein said floating-point store instruction specifies store data and a store address, wherein said execution pipeline is configured to detect that said store data corresponds to a tiny number and an underflow exception is masked;

a retire queue coupled to said execution pipeline, wherein said retire queue is configured to set a store exception bit if said store data corresponds to a tiny number and said underflow exception is masked; and a control unit coupled to said execution pipeline and said retire queue, wherein said control unit is configured to convey a trap signal to said reorder buffer if said store data corresponds to a tiny number and said underflow exception is masked;

wherein said execution pipeline is configured to store said store data in a register corresponding to a designated register number if said store data corresponds to a tiny number and said underflow excep tion is masked, wherein said execution pipeline is configured to execute a trap routine in response to said trap signal, wherein said trap routine is configured to read said store data from said register and generate corrected store data in response to said store exception bit being set, and wherein said execution pipeline is configured to convey said corrected store data to said load/store unit;

wherein said floating-point execution unit is configured to generate a store cancel signal indicating that a store operation corresponding to said floating-point store instruction should be cancelled if said store data corresponds to a tiny number and said underflow exception is masked; and an input/output (I/O) device coupled to said microprocessor and to another computer system, wherein said I/O device is configured to communicate between said microprocessor and said another computer system.

22. The computer system as recited in claim 21, wherein said I/O device comprises a modem.

* * * * *